W. PETERMAN.
TROLLEY DEVICE.
APPLICATION FILED APR. 12, 1910.

965,740.

Patented July 26, 1910.

Witnesses

Inventor
William Peterman.
By E. E. Vrooman,
his Attorney

UNITED STATES PATENT OFFICE.

WILLIAM PETERMAN, OF BEAVER FALLS, PENNSYLVANIA, ASSIGNOR OF ONE-HALF TO WILLIAM WIESNER, OF BEAVER FALLS, PENNSYLVANIA.

TROLLEY DEVICE.

965,740.  Specification of Letters Patent.  Patented July 26, 1910.

Application filed April 12, 1910. Serial No. 554,991.

*To all whom it may concern:*

Be it known that I, WILLIAM PETERMAN, a citizen of the United States of America, residing at Beaver Falls, in the county of Beaver and State of Pennsylvania, have invented certain new and useful Improvements in Trolley Devices, of which the following is a specification, reference being had therein to the accompanying drawing.

This invention relates to trolleys, and has especial reference to trolleys employing a device for preventing the trolley wheel from leaving the wire in rounding curves.

The invention has for its object to provide an improved device of this character which is simple in construction and which will effectively prevent a trolley wheel from leaving the wire in rounding a curve.

Figure 1:
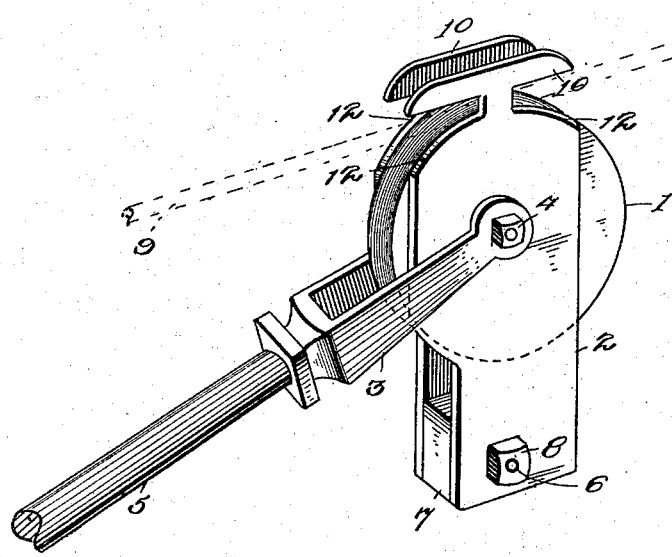
Figure 2:
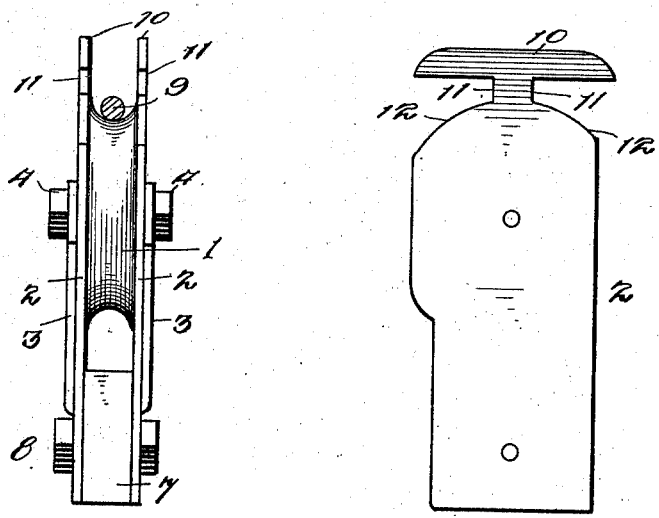
Figure 3:
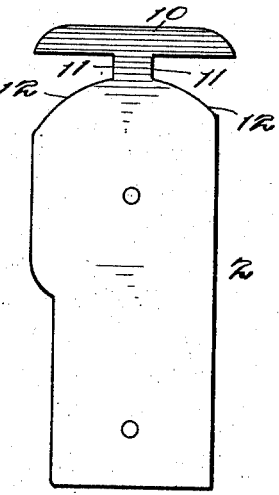

Referring to the accompanying drawings,—Figure 1 is a view in perspective of a trolley constructed in accordance with this invention. Fig. 2 is an end view thereof. Fig. 3 is a side view of one of the supporting plates, detached.

In carrying out the invention, I provide a trolley wheel, 1, having its axle extending through side bearing plates, 2, and through the arms of a harp, 3, secured by nuts 4, and mounted on a trolley pole, 5. The plates 2 are held together at their lower ends by means of a pin, 6, extending through a filling block, 7, and secured by nuts, 8, on the pin 6.

In order to retain the trolley wheel on the trolley wire, 9, in rounding curves, the groove of the trolley wheel is made somewhat wider than the diameter of the trolley wire, say about three-sixteenths of an inch, and in conjunction therewith, a device is provided for preventing the trolley wheel from leaving the wire in rounding a curve, which consists of the longitudinal strips, 10, each located at the upper end of each plate 2 and connected thereto by a short neck, 11, thereby forming spaces between the upper end of each plate 2 and the under straight edge of the strip 10. The upper end of each plate 2 is preferably formed with the curved shoulders, 12, located in alinement with the periphery of the trolley wheel, whereby when the trolley wheel is passing along a curve of the trolley wire, if the wheel should be turned at such an angle as to leave the wire, two ends of the horizontal strips 10 will extend over the wire and the wire would extend between said ends of the strip 10, and a pair of the curved shoulders 12 of the plates 2.

It will be seen that by means of this construction, the trolley wheel will be effectively prevented from leaving the trolley wire in rounding a curve when moving in either direction, since as the trolley wheel in the movement of the car is brought to the straight portion of the trolley wire, the ends of the strip 10, swinging back to normal position, will cause the wire to be directed back into the groove of the trolley wheel.

Having described the invention, I claim:

1. In a device of the character described, a trolley wheel, a pair of vertical plates mounted on the axle of said trolley wheel, each of said plates having its upper edge in alinement with the upper edge of the trolley wheel, and having a vertical projection at the top of each plate and a horizontal guard strip at the top of each vertical projection, and spaced above the upper edge of said wheel and located above the trolley wheel.

2. In a device of the character described, a trolley wheel having a broad groove considerably wider than the trolley wire, side members supported on the axle of the trolley wheel, each of said side members having its upper end in alinement with the upper edge of the trolley wheel and having longitudinal guard strips mounted upon and elevated above the top of each of said side members, and above the trolley wheel, whereby if the trolley wheel slips off the wire the longitudinal guard strips will be swung over the wire in rounding a curve and guide the trolley wheel back into place.

3. In a device of the character described, a trolley wheel, a pair of vertical plates mounted on the axle of the trolley wheel and secured together at their lower end, a harp secured to the axle of said trolley wheel, said plates each formed with a vertical projection at its top, and a longitudinal strip centrally connected to said vertical projection, said plates each having a pair of curved shoulders at its top in alinement with the periphery of the trolley wheel and spaced from the lower edge of said longitudinal strips.

In testimony whereof I hereunto affix my signature in presence of two witnesses.

WILLIAM PETERMAN.

Witnesses:
T. C. KENNON,
G. L. BEAUMONT.